(12) United States Patent
Dal Farra

(10) Patent No.: US 10,903,931 B1
(45) Date of Patent: Jan. 26, 2021

(54) TRANSMIT POWER EQUALIZATION IN A RECONFIGURABLE OPTICAL ADD-DROP MULTIPLEXER

(71) Applicant: Fujitsu Limited, Kawasaki (JP)

(72) Inventor: David Dal Farra, Richardson, TX (US)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 16/549,657

(22) Filed: Aug. 23, 2019

(51) Int. Cl.
*H04J 14/02* (2006.01)
*H04Q 11/00* (2006.01)
*H04B 10/564* (2013.01)

(52) U.S. Cl.
CPC ........ *H04J 14/0221* (2013.01); *H04B 10/564* (2013.01); *H04J 14/0212* (2013.01); *H04Q 11/0066* (2013.01)

(58) Field of Classification Search
CPC .............. H04J 14/0221; H04J 14/0212; H04B 10/564; H04Q 11/0066
See application file for complete search history.

(56) References Cited

U.S. PATENT DOCUMENTS

| | | | |
|---|---|---|---|
| 9,986,317 B1* | 5/2018 | Al Sayeed | H04J 14/0272 |
| 10,411,796 B1* | 9/2019 | Archambault | H04B 10/27 |
| 10,439,709 B1* | 10/2019 | Al Sayeed | H04J 14/0217 |
| 2008/0232738 A1* | 9/2008 | Yang | H04J 14/0206 385/24 |
| 2009/0116841 A1* | 5/2009 | Yang | H04J 14/0206 398/83 |
| 2010/0202777 A1* | 8/2010 | Liu | H04J 14/0204 398/83 |
| 2010/0329686 A1* | 12/2010 | Frankel | H04B 10/25253 398/83 |
| 2013/0058647 A1* | 3/2013 | Boertjes | H04J 14/021 398/38 |

(Continued)

OTHER PUBLICATIONS

Lyonnais, Marc, "State of the art and best practices for optical network self monitoring and optimization," Optical Fiber Communication Conference (OFC) 2019, OSA Technical Digest (Optical Society of America, 2019), paper Th1G.5.

(Continued)

*Primary Examiner* — Mina M Shalaby
(74) *Attorney, Agent, or Firm* — Baker Botts L.L.P.

(57) ABSTRACT

An optical system including a ROADM including previously in-service channels; a SDN computing module in communication with the ROADM over a DCN, the SDN computing module providing an instruction to place in-service an additional channel at the ROADM; an optical controller included by the ROADM and configured to, in response to the instruction to place in-service the additional channel at the ROADM: obtain optical power targets for each in-service channel including the previously in-service channels and the additional in-service channel; equalize a transmit power for each in-service channel of the ROADM, including: identify the transmit power of each in-service channel; transition each in-service channel to a power mode; adjust the transmit power of each in-service channel based on, for each in-service channel, the optical power target for the in-service channel and the identified transmit power for the in-service channel; and transition each in-service channel to a steady state mode.

20 Claims, 8 Drawing Sheets

(56) References Cited

U.S. PATENT DOCUMENTS

| | | | |
|---|---|---|---|
| 2015/0117858 A1* | 4/2015 | Al Sayeed | H04J 14/0221 |
| | | | 398/38 |
| 2016/0241936 A1* | 8/2016 | Nagamine | H04B 10/564 |
| 2017/0085316 A1* | 3/2017 | Al Sayeed | H04J 14/0201 |
| 2018/0270009 A1* | 9/2018 | Mansouri Rad | H04B 10/032 |
| 2018/0343078 A1* | 11/2018 | Roberts | H04J 14/0275 |
| 2019/0173602 A1* | 6/2019 | Al Sayeed | H04J 14/021 |
| 2019/0253361 A1* | 8/2019 | MacKay | H04L 41/147 |
| 2020/0028765 A1* | 1/2020 | Schmogrow | H04L 45/02 |
| 2020/0059712 A1* | 2/2020 | Satyarthi | H04J 14/0212 |
| 2020/0067624 A1* | 2/2020 | Tsuzuki | H04J 14/0267 |

OTHER PUBLICATIONS

Open ROADM-MSA Specification, v. 3.00, Dec. 17, 2018.

* cited by examiner

TRANSMIT POWER EQUALIZATION IN A RECONFIGURABLE OPTICAL ADD-DROP MULTIPLEXER

BACKGROUND

Field of the Disclosure

The present disclosure relates generally to optical communication networks and, more particularly, an optical system that facilitates transmit power equalization in a reconfigurable optical add-drop multiplexer (ROADM).

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

Optical networks may also include various optical elements, such as amplifiers, dispersion compensators, multiplexer/demultiplexer filters, wavelength selective switches (WSS), optical switches, splitters, couplers, etc. to perform various operations within the network. In particular, optical networks may include reconfigurable optical add-drop multiplexers (ROADMs) that enable routing of optical signals and individual wavelengths to different destinations.

ROADMs, when implemented in an open (non-proprietary) optical network, may not be allowed to communicate optical control information between nodes in the network. As a result, they do not compensate for changes in optical powers of existing wavelength services when new services are turned up or turned down, setting only the newly provisioned wavelength services to target. This can lead to regenerating the signal more frequently, and additional costs on the optical network.

SUMMARY

Innovative aspects of the subject matter described in this specification may be embodied in a method for identifying a reconfigurable optical add-drop multiplexer (ROADM), the ROADM including a plurality of previously in-service channels; identifying, by an optical controller, an additional channel that is to be placed in-service at the ROADM; in response to identifying that the additional channel is to be placed in-service at the ROADM: obtaining, by the optical controller, optical power targets for each in-service channel including the plurality of previously in-service channels and the additional in-service channel; equalizing, by the optical controller, a transmit power for each in-service channel of the ROADM, including: identifying the transmit power of each in-service channel; transitioning, at the ROADM, each in-service channel to a power mode; after transitioning each in-service channel to the power mode, adjusting, at the ROADM, the transmit power of each in-service channel based on, for each in-service channel, the optical power target for the in-service channel and the identified transmit power for the in-service channel; and after adjusting the transmit power of each in-service channel, transitioning, at the ROADM, each previously in-service channel to a steady state mode independent of instruction from a software-defined networking (SDN) computing module.

Other embodiments of these aspects include corresponding systems and apparatus.

These and other embodiments may each optionally include one or more of the following features. For instance, after equalizing the transmit power for each in-service channel of the ROADM, at a first time, equalizing, by the optical controller and at a second time after the first time, the transmit power for each in-service channel, including: identifying an updated transmit power of each in-service channel; and adjusting, at the ROADM, the updated transmit power of each in-service channel based on, for each in-service channel, the optical power target for the in-service channel and the identified updated transmit power for the in-service channel. Adjusting a first in-service channel by increasing the transmit power of the first in-service channel; and adjusting a second in-service channel by decreasing a transmit power of the second in-service channel. Receiving, for each in-service channel, the optical power targets over a network from the SDN computing module. The optical controller equalizes the transmit power for each previously in-service channel only in response to instructions from the SDN computing module to transition the additional channel to the power mode. The transmit power is equalized, for each previously in-service channel, less than or equal to a threshold number of times. In response to identifying that the additional channel is to be placed in-service, the transmit power of each in-service channel is adjusted initially at a first multiplexer connected to an add transponder and proceed in sequence downstream through each node serially including a far end drop node.

Innovative aspects of the subject matter described in this specification may be embodied in a method for identifying a reconfigurable optical add-drop multiplexer (ROADM), the ROADM including a plurality of previously in-service channels; identifying, by an optical controller, that a previously in-service channel is to be placed out of service at the ROADM; in response to identifying that the previously in-service channel is to be placed out of service at the ROADM: obtaining, by the optical controller, optical power targets for each in-service channel; equalizing, by the optical controller, a transmit power for each in-service channel of the ROADM, including: identifying the transmit power of each in-service channel; transitioning, at the ROADM, each in-service channel to a power mode; after transitioning each in-service channel to the power mode, adjusting, at the ROADM, the transmit power of each in-service channel based on, for each in-service channel, the optical power target for the in-service channel and the identified transmit power for the in-service channel; and after adjusting the transmit power of each in-service channel, transitioning, at the ROADM, each remaining in-service channel to a steady state mode independent of instructions from a software-defined networking (SDN) computing module.

Other embodiments of these aspects include corresponding systems and apparatus.

These and other embodiments may each optionally include one or more of the following features. For instance, after equalizing the transmit power for each in-service channel of the ROADM, at a first time, equalizing, by the optical controller and at a second time after the first time, the transmit power for each in-service channel, including: identifying an updated transmit power of each in-service channel; and adjusting, at the ROADM, the updated transmit power of each in-service channel based on, for each in-service channel, the optical power target for the in-service channel and the identified updated transmit power for the in-service channel. Adjusting a first in-service channel by increasing the transmit power of the first in-service channel; and adjusting a second in-service channel by decreasing a transmit power of the second in-service channel. Receiving, for each in-service channel, the optical power targets over a network from the SDN computing module. The optical controller equalizes the transmit power for each in-service channel only in response to instructions from the SDN computing module to transition the additional channel to the power mode. The transmit power is equalized, for each previously in-service channel, less than or equal to a threshold number of times. In response to identifying that the previously in-service channel is to be placed out of service, the transmit power of each in-service channel is adjusted initially at a first multiplexer connected to a drop transponder and proceed in sequence upstream through each node serially including an add node.

Innovative aspects of the subject matter described in this specification may be embodied in a system including a reconfigurable optical add-drop multiplexer (ROADM), the ROADM including a plurality of previously in-service channels; a software-defined networking (SDN) computing module in communication with the ROADM over a dynamic circuit network (DCN), the SDN computing module providing an instruction to place in-service an additional channel at the ROADM; an optical controller included by the ROADM and configured to, in response to the instruction to place in-service the additional channel at the ROADM: obtain optical power targets for each in-service channel including the plurality of previously in-service channels and the additional in-service channel; equalize a transmit power for each in-service channel of the ROADM, including: identify the transmit power of each in-service channel; transition, at the ROADM, each in-service channel to a power mode; after transitioning each in-service channel to the power mode, adjust, at the ROADM, the transmit power of each in-service channel based on, for each in-service channel, the optical power target for the in-service channel and the identified transmit power for the in-service channel; and after adjusting the transmit power of each in-service channel, transition, at the ROADM, each previously in-service channel to a steady state mode independent of instruction from a software-defined networking (SDN) computing module.

Other embodiments of these aspects include corresponding methods and apparatus.

These and other embodiments may each optionally include one or more of the following features. For instance, adjusting a first in-service channel by increasing the transmit power of the first in-service channel; and adjusting a second in-service channel by decreasing a transmit power of the second in-service channel. Receiving, for each in-service channel, the optical power targets over a network from the SDN computing module. The transmit power is equalized, for each previously in-service channel, less than or equal to a threshold number of times. In response to identifying that the additional channel is to be placed in-service, the transmit power of each in-service channel is adjusted initially at a first multiplexer connected to an add transponder and proceed in sequence downstream through each node serially including a far end drop node. The optical controller further configured to: after equalizing the transmit power for each in-service channel of the ROADM, at a first time, equalizing, by the optical controller and at a second time after the first time, the transmit power for each in-service channel, including: identifying an updated transmit power of each in-service channel; and adjusting, at the ROADM, the updated transmit power of each in-service channel based on, for each in-service channel, the optical power target for the in-service channel and the identified updated transmit power for the in-service channel.

Particular implementations of the subject matter described in this specification can be implemented so as to realize one or more of the following advantages through a reduction in channel imbalance caused by system gain ripple or non-linearity (for example stimulated Raman scattering (SRS)): improvements to network end to end optical reach, reduction of signal regeneration, and reduced risk of ring lasing.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
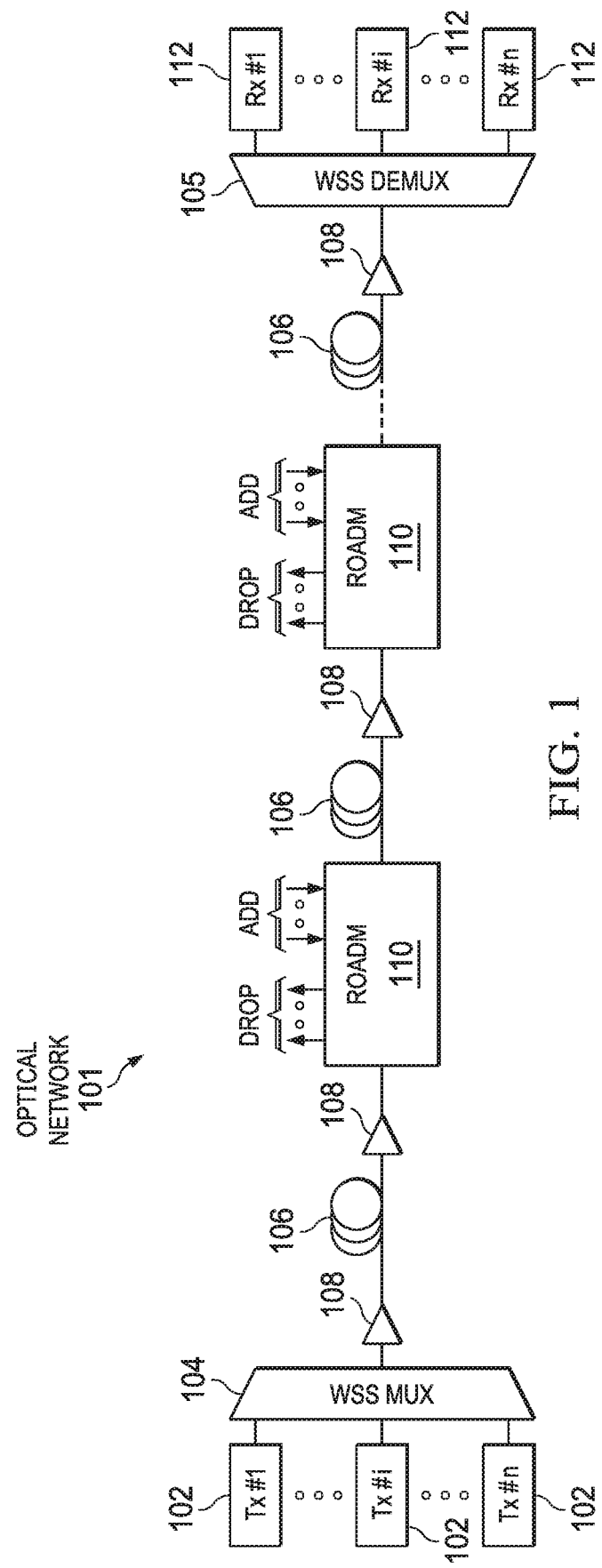
FIG. 1 is a block diagram of selected elements of an embodiment of an optical network.

This document describes a method and a system for re-equalizing in-service wavelengths in an optical environment when a new service is turned up or an existing service is turned down. Specifically, an optical power controller can be executed independently by ROADM nodes of the optical environment during service turn up and/or service turn down. The optical controller can facilitate equalizing all in-service wavelengths to a target optical power based on optical power readings provided by an optical channel monitor and optical targets when any one service is turned up or turned down.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

As noted above, ROADMs are deployed in many applications in optical networks. Typical ROADMs are designed to accommodate any number of degrees, each of which may support up to any number of optical channels or wavelengths (e.g., 128 or more) in particular implementations. In describing a ROADM generally, a 'degree' is a term used to describe a switched optical path to or from the ROADM, which may be a bidirectional optical path or a pair of optical fibers in some instances.

Referring now to the drawings, FIG. 1 illustrates an example embodiment of optical network 101, which may represent a portion of an optical communication system. Optical network 101 may include one or more optical fibers 106 to transport one or more optical signals communicated by components of optical network 101. The network elements of optical network 101, coupled together by fibers 106, may comprise one or more transmitters 102, one or more optical amplifiers 108, one or more reconfigurable optical add/drop multiplexers (ROADM) 110, one or more multiplexers (MUX) 104, one or more demultiplexers (DE-MUX) 105, and one or more receivers 112. The optical network 101 can represent a portion of a bidirectional optical network, e.g., a unidirectional portion of a bidirectional optical network.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include any data rate, for example, 100 Gbit/s, 400 Gbit/s, or 1 Tbit/s. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple optical channels may be combined into a single wideband optical connection. The process of communicating information at multiple channels is referred to in optics as wavelength division multiplexing (WDM).

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals (or optical signals) and modulate the information contained in the electrical signals onto a beam of light produced by the laser at a particular wavelength, and transmit the beam for carrying the signal throughout optical network 101.

MUX 104 may be coupled to transmitters 102 and may be a system, apparatus or device to combine the signals transmitted by transmitters 102, e.g., at respective individual wavelengths, into a WDM connection.

Optical amplifiers 108 may amplify the multi-channeled connections within optical network 101. Optical amplifiers 108 may be positioned before or after certain lengths of fiber 106. Optical amplifiers 108 may comprise a system, apparatus, or device to amplify optical signals.

ROADMs 110 may be coupled to optical network 101 via fibers 106. ROADMs 110 comprise an add/drop module, which may include a system, apparatus or device to add and drop optical signals (for example at individual wavelengths) or to passthrough wavelengths to other degrees from fibers 106. After passing through a ROADM 110, optical signals may travel along fibers 106 directly to a destination, or the signals may be passed through one or more additional ROADMs 110 and optical amplifiers 108 before reaching a destination.

In certain embodiments of optical network 101, ROADM 110 is capable of adding or dropping individual or multiple wavelengths of a WDM connection. The individual or multiple wavelengths may be added or dropped in the optical domain, for example, using a wavelength selective switch (WSS) that may be included in a ROADM. ROADMs are considered 'colorless' when the ROADM is able to add/drop any arbitrary wavelength. ROADMs are considered 'directionless' when the ROADM is able to add/drop any viable wavelength regardless of the direction of propagation. ROADMs are considered 'contentionless' when the ROADM is able to switch to avoid wavelength contention (already occupied wavelength) on any port. As shown ROADM 110 may represent an implementation of a route and select ROADM, as disclosed herein.

As shown in FIG. 1, optical network 101 may also include DEMUX 105 at one or more destinations of network 101. DEMUX 105 may comprise a system apparatus or device that acts as a demultiplexer by splitting a single composite WDM connection into individual channels at respective wavelengths or into groups of channels to a port. For example, optical network 101 may transmit and carry a 128 channel DWDM connection. DEMUX 105 may divide the single, 128 channel DWDM connection into multiple signals with arbitrary wavelength assignment.

In FIG. 1, optical network 101 may also include receivers 112 coupled to ROADM 105. Each receiver 112 may receive optical signals transmitted at a particular wavelength or channel, and may process the optical signals to obtain (e.g., demodulate) the information (i.e., data) that the optical signals contain. Accordingly, network 101 may include up to one receiver 112 for every channel of the network. Transmitters 102 may transmit the optical signal locally or to other degrees.

Optical networks, such as optical network 101 in FIG. 1, may employ modulation techniques to convey information in the optical signals over the optical fibers.

In an optical network, such as optical network 101 in FIG. 1, it is typical to refer to a management plane and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

Figure 2:
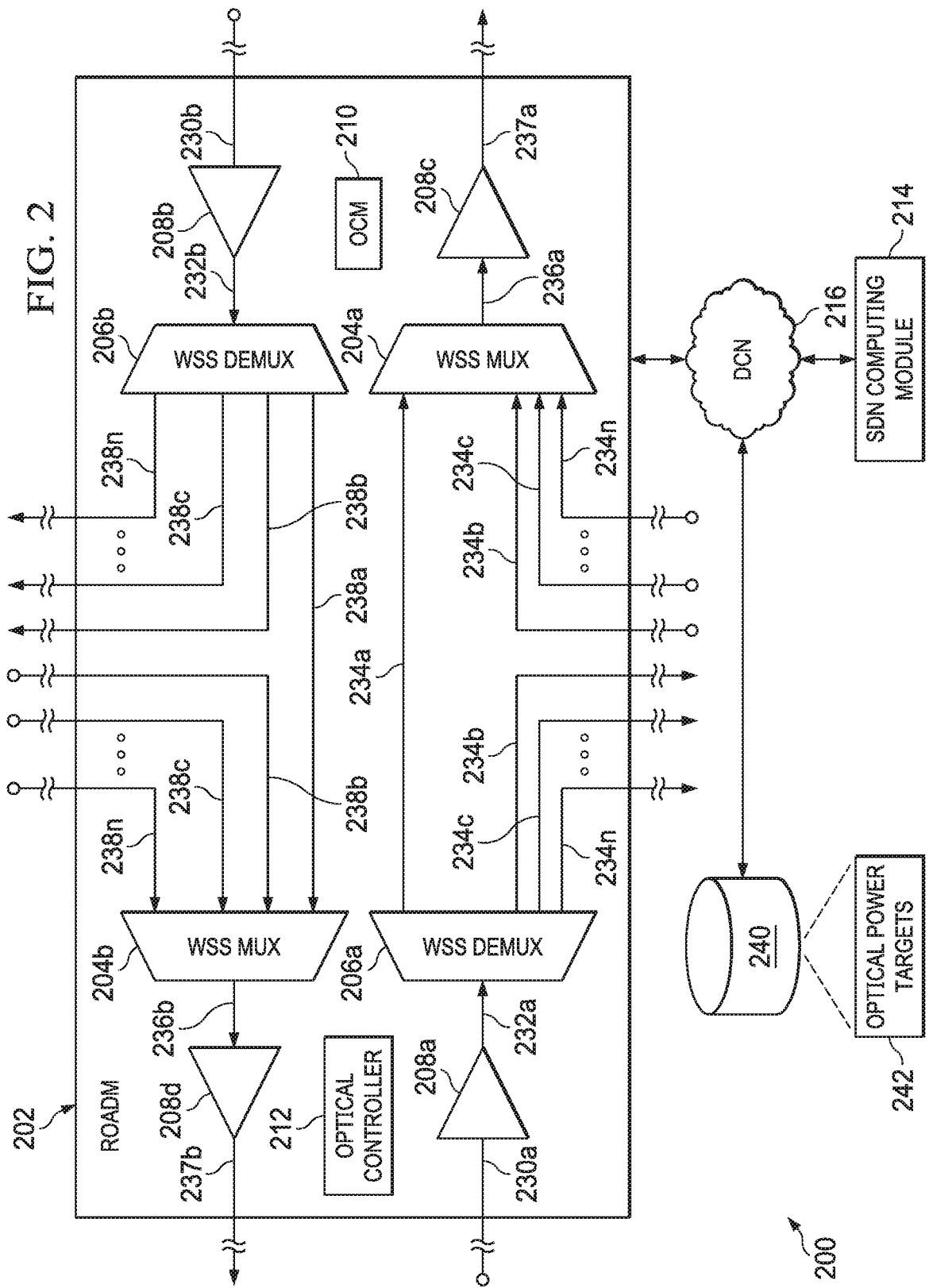
FIG. 2 is a block diagram for an optical environment.

FIG. 2 illustrates an optical environment 200. The optical environment 200 can include a reconfigurable optical add-drop multiplexer (ROADM) 202. The ROADM 202 can include multiplexers 204a, 204b (collectively referred to as multiplexers 204), demultiplexers 206a, 206b (collectively referred to as demultiplexers 206), optical amplifiers 208a, 208b, 208c, 208d (collectively referred to as optical amplifiers 208), an optical channel monitor (OCM) 210, and an optical controller 212. In some examples, the optical environment 200 can incorporate one or more elements of the optical network 101.

The optical environment 200 can further include a software-defined networking (SDN) computing module 214 in communication with the ROADM 202 over a dynamic circuit network (DCN) 216. In some examples, the multiplexers 204 and the demultiplexers 206 can function as an optical module, and include one or more processors. The multiplexers 204 can include wavelength selective switching (WSS) multiplexers, and the demultiplexers 206 can include WSS demultiplexers. In some examples, the optical environment 200 can include two or more ROADMs, described further herein.

The optical controller 212 can be in communication with the SDN computing module 214, and/or the DCN 216. In some examples, the optical controller 212 is in communication with the multiplexers 204 and the demultiplexers 206. The optical controller 212 can include one or more processing modules to facilitate equalizing transmit powers at the ROADM 202, described further herein. The optical environment 200 can further include a database 240 that can store data indicating optical power targets 242.

Passthrough connection 234a can extend between the demultiplexer 206a and the multiplexer 204a, and carry one or more channels with respective wavelengths (or colors, or services) being transmitted on the respective channels between the demultiplexer 206a and the multiplexer 204a. Similarly, passthrough connection 238a can extend between the demultiplexer 206b and the multiplexer 204b, and carry multiple channels with respective wavelengths (or colors, or services) being transmitted on the respective channels between the demultiplexer 206b and the multiplexer 204b.

Optical connections 234b, 234c, . . . 234n (collectively referred to as optical connections 234) and optical connections 238b, 238c, . . . , 238n (collectively referred to as optical connections 238) can be local add/drops or connections to other degrees and carry multiple channels with respective wavelengths being transmitted on the respective channels. For example, optical connections 234, 238 can be in communication with further optical components, e.g., passthroughs to other degrees or add/drop channels. For example, one or more of the optical connections 234, 238 can be in communication with a further local transponder, an external multiplexer or demultiplexer, and/or to a separate multiplexer or demultiplexer that supports another degree (e.g., to create a mesh network). Each of the optical connections 234, 238 can carry multiple channels with respective wavelengths.

The optical amplifier 208a can receive input signals 230a. The input signals 230a can include a set of wavelengths (or colors, or services). The optical amplifier 208a can amplify the signals 230a to produce signals 232a. The demultiplexer 206a can receive the signals 232a. The demultiplexer 206a can split (or partition) the signals 232a into multiple sets of wavelengths that are transmitted over respective passthrough connection 234a and/or optical connections 234b, 234c, . . . , 234n. In some examples, a subset of the channels of the passthrough connection 234a and the optical connections 234b, 234c, . . . , 234n are placed in-service to transmit respective wavelengths. For example, the passthrough connection 234a can include 96 channels; however, only 90 channels of the 96 channels of the passthrough connection 234a are in-service—i.e., the demultiplexer 206a routes 90 wavelengths that are transmitted over the in-service channels. The multiplexer 204a can receive the wavelengths of the channels over the passthrough connection 234a and the optical connections 234b, 234c, . . . , 234n and combine the wavelengths to produce signals 236a. In some examples, the multiplexer 204a combines the signals from the passthrough connection 234a with a signal from one or more of the optical connections 234b, 234c, . . . , 234n. The optical amplifier 208c can receive the signals 236a and amplify the signals to produce signals 237a.

Similarly, the optical amplifier 208b can receive input signals 230b. The input signals 230b can include a set of wavelengths (or colors, or services). The optical amplifier 208b can amplify the signals 230b to produce signals 232b. The demultiplexer 206b can receive the signals 232b. The demultiplexer 206b can split (or partition) the signals 232b into multiple sets of wavelengths that are transmitted over respective channels of the passthrough connection 238a and/or the optical connections 238b, 238c, . . . , 238n. In some examples, a subset of the channels of the passthrough connection 238a and/or the optical connections 238b, 238c, . . . , 238n transmit respective wavelengths. For example, the passthrough connection 238a can include 96 channels; however, only 90 channels of the 96 channels of the passthrough connection 238a are in-service—i.e., the demultiplexer 206b routes 90 wavelengths that are transmitted over the in-service channels. The multiplexer 204b can receive the wavelengths of the channels over the passthrough connection 238a and/or the optical connections 238b, 238c, . . . , 238n and combine the wavelengths to produce signals 236b. In some examples, the multiplexer 204b combines the signals from the passthrough connection 238a with a signal from one or more of the optical connections 238b, 238c, . . . , 238n. The optical amplifier 208d can receive the signals 236b and amplify the signals to produce signals 237b.

The ROADM 202 can be a two-degree ROADM; however, the ROADM 202 can be any degree ROADM depending on the application desired.

The optical channel monitor (OCM) 210 can monitor an optical transmit power (or optical power, or transmit power) of any combination of the in-service channels of the passthrough connections 234a, 238b; the optical connections 234b, 234c, . . . 234n, the optical connections 238b, 238c, . . . , 238n, the signals 230a, 230b, 237a, 237b, and/or the signals 232a, 232b, 236a, 236b. For simplicity of illustration, connections between the optical channel monitor 210 and the respective channels and signals is not shown.

The SDN computing module 214 can manage the ROADM 202, including placing in-service of new channels (turning up) at the ROADM 202, placing out of service channels (turning down) at the ROADM 202, restart/power cycle of the ROADM 202, span loss measurement and adjustment at the ROADM 202, and fiber cut recovery, described further herein. The SDN computing module 214 can further transition the signals at the ROADM 202 to different operating modes including constant power (power mode), steady state ("gainLoss" mode), and off-mode, described further herein.

In some implementations, the optical controller 212 can identify an additional channel that is to be placed in-service at the ROADM 202. For example, the SDN computing module 214 can provide such instructions to the ROADM 202 over the DCN 216, e.g., that an additional channel is to be in-service at the ROADM 202. That is, an additional channel is to be added at the multiplexer 204a.

The optical controller 212, in response to identifying an additional channel is to be placed in-service at the ROADM 202, can obtain the optical power targets 242 (or data indicating the optical power targets 242) for each in-service channel. For example, the optical controller 212 can obtain the optical power targets 242 for each in-service channel of the passthrough connection 234a and/or the optical connections 234b, 234c, . . . , 234n. Specifically, the optical controller 212 can obtain the optical power targets 242 for each in-service channel including the channels that were in-service prior to receiving the instruction to place in-service the additional channel, and including the newly in-service channel. In some examples, the SDN computing module 214 can provide the optical power targets 242 to the ROADM 202, the optical controller 212, or both. The SDN computing module 214 can provide the optical power targets 242 at the "start of life" of the ROADM 202. In some examples, the optical power targets 242 are provided/specified by a governing body or consortium (e.g., the Open-ROADM consortium). In some examples, the optical power targets 242 can differ for each in-service channel.

In some examples, the optical controller 212 obtains the optical power targets 242 by identifying the database 240 that can be stored by a local memory to the ROADM 202. The database 240 can include the optical power targets 242 for each in-service channel of the ROADM 202. The optical controller 212 can then access, from the database 240, the optical power targets 242 for each in-service channel of the passthrough connection 234a and the optical connections 234b, 234c, . . . , 234n including the channels that were in-service prior to receiving the instruction to place in-service the additional channel, and including the newly in-service channel. In some examples, the optical controller 212 obtains the optical power targets 242 by receiving, for each of the in-service channels, the optical power targets 242 over the DCN 216 from the SDN computing module 214.

The optical controller 212, further in response to identifying an additional channel is to be in-service at the ROADM 202, can equalize a transmit power for each in-service channel of the ROADM 202. Specifically, the optical controller 212 can identify the transmit power of each in-service channel of the passthrough connection 234a or optical connections 234b, 234c, . . . , 234n. For example, the optical controller 212, for each in-service channel including the channels that were in-service prior to receiving the instructions to place in-service the additional channel, and including the newly in-service channel, identifies the transmit power of the in-service channel. In some examples, the transmit power of the in-service channel can include the transmit power of the channel (and corresponding wavelength of the channel) that is output by the multiplexer 204a, i.e., the transmit power at the signals 236a. In some examples, the OCM 210 can identify the transmit power of the in-service channels (and corresponding wavelengths) that are output by the optical amplifier 208c (e.g., at the signals 237a) and transmit such data to the optical controller 212. In other words, the OCM 210 can take per-channel power readings of all pre-existing in-service channels and the newly in-service channel.

The SDN computing module 214 can further provide instructions to transition the additional channel to be placed in-service to a power mode. In response, the optical controller 212, in furtherance of equalizing the transmit power for each in-service channel of the ROADM 202, can transition each in-service channel of the passthrough connection 234a and/or the optical connections 234b, 234c, . . . , 234n to a power mode. That is, the optical controller 212 can change the state of each of the in-service channels, including the channels that were in-service prior to receiving the instructions to place in-service the additional channel, and including the newly in-service channel, to a power mode to hold a constant optical power of the in-service channels. Specifically, the power mode of the channels can be employed by the optical controller 212 to place in-service additional channels, and/or place channels out of service, to achieve desired optical power targets, described further herein. The optical controller 212 transitions each of the channels that were in-service prior to receiving the instructions to place in-service the additional channel only in response to the instructions to transition the additional channel to be placed in-service to a power mode. That is, the SDN computing module 214 does not provide specific instructions to transition the remaining in-service channels to power mode other than the instructions to transition the additional channel to be in-service to a power mode.

The optical controller 212, in furtherance of equalizing the transmit power for each in-service channel of the passthrough connection 234a and/or optical connection 234b, 234c, . . . , 234n of the ROADM 202, can adjust the transmit power of each of the in-service channels. Specifically, the optical controller 212 can adjust the transmit power of each of the in-service channels, including the channels that were in-service prior to receiving the instructions to place in-service the additional channel, and including the newly in-service channel. In some examples, the optical controller 212 can adjust the transmit power of each of the in-service channels after transitioning each of the in-service channels to the power mode. The optical controller 212 can adjust the transmit power of each of the in-service channels based on, for each in-service channel, i) the optical power target 242 for the in-service channel and ii) the identified transmit power for the in-service channel.

Specifically, in some examples, the optical controller 212 can compare, for each in-service channel of the passthrough connection 234a and/or the optical connections 234b, 234c, . . . , 234n, the optical power target 242 for the in-service channel with the transmit power for the in-service channel. Based on such comparison, the optical controller 212 can adjust the transmit power of the in-service channel to more closely match the optical power target 242 (or within a threshold). In some examples, the optical controller 212 can adjust the transmit power of the in-service channel a predetermined amount, or any amount, to more closely match the optical power target 242 for the in-service channel. For example, the optical controller 212 can adjust a first in-service channel by increasing the transmit power of the first in-service channel, and adjust a second in-service channel by decreasing the transmit power of the second channel. In some examples, the transmit power of the second in-service channel is greater than the transmit power of the first in-service channel.

In some examples, the optical controller 212 can adjust the transmit power of the in-service channels of the passthrough connection 234a and/or the optical connections 234b, 234c, . . . , 234n, including the channels that were in-service prior to receiving the instructions to place in-service the additional channel. That is, the SDN computing module 214 can provide an instruction to adjust the transmit power of the newly in-service channel, and the optical controller 212 can adjust the remaining in-service channels independent of the instruction from the SDN computing module 214.

Figure 3:
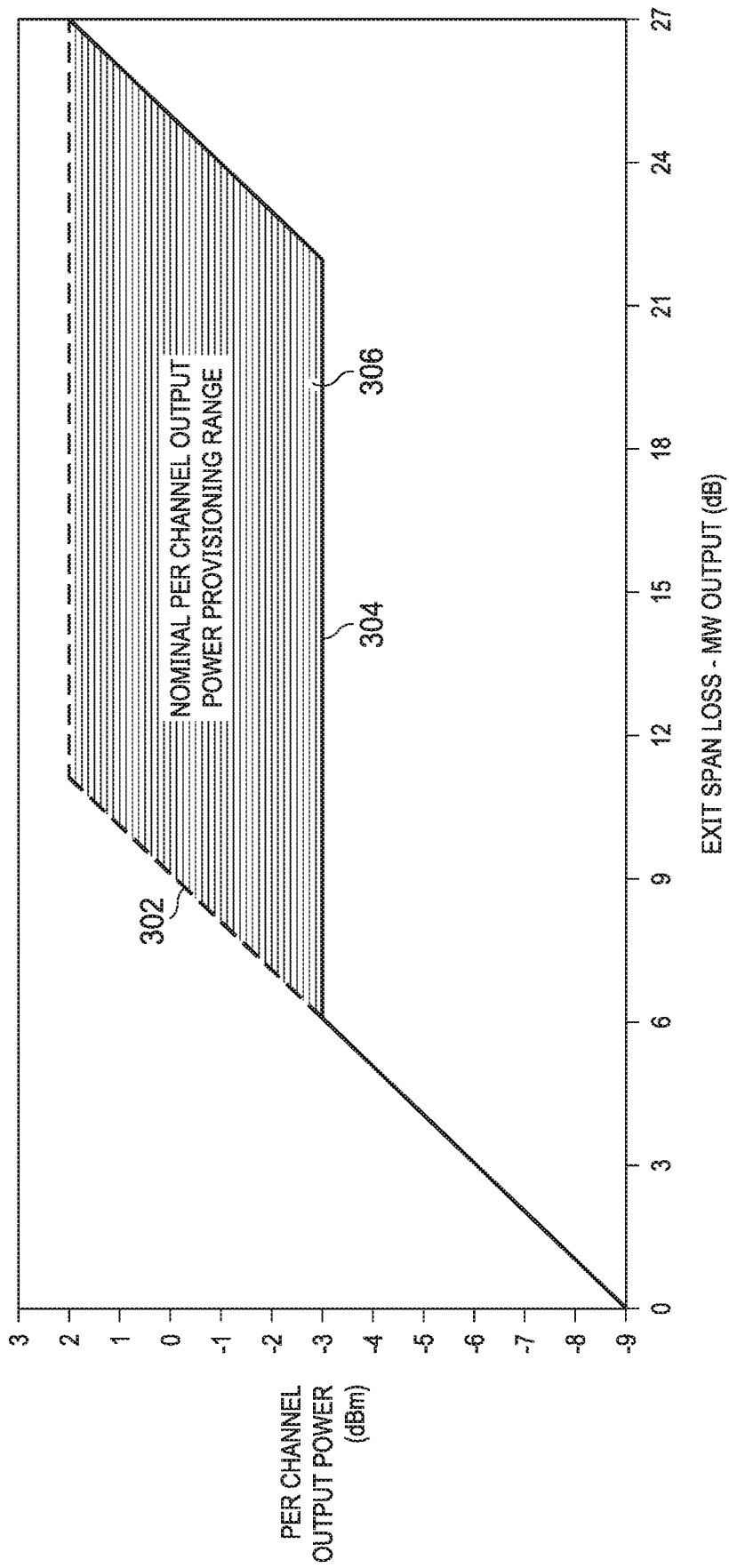
FIG. 3 illustrates a graph displaying a nominal per channel power provisioning range for in-service channels.

FIG. 3 illustrates an example graph 300 displaying a nominal per channel power provisioning range for the in-service channels. Specifically, the graph 300 includes a first line 302 and a second line 304 of the exit span loss (dB) versus the per channel output power (dBm) defining the power provisioning range 306. The first line 302 is an optimum transmit power for each in-service channel, and the second line 304 is a tolerance transmit power for each in-service channel. Specifically, the optical controller 212 can adjust the transmit power of each of the in-service channels to be within the power provisioning range 306.

In some examples, after equalizing the transmit power for each of the in-service channels of the passthrough connection 234a and/or the optical connections 234b, 234c, . . . , 234n in the ROADM 202 at a first time, the optical controller 212 can equalize (or re-equalize), at a second time after the first time, the transmit power for each of the in-service channels. That is, the optical controller 212 can identify the updated transmit power of each in-service channel (after equalization of the transmit powers of the in-service channels at the first time). In some examples, the updated transmit power of the in-service channel can include the updated transmit power of the channel (and corresponding wavelength of the channel) that is output by the multiplexer 204a, i.e., the transmit power at the signals 236a. In some examples, the OCM 210 can identify the updated transmit power of the in-service channels (and corresponding wavelengths) that are output by the optical amplifier 208c (e.g., at the signals 237a) and transmit such data to the optical controller 212.

The optical controller 212, can compare, for each in-service channel of the passthrough connection 234a and/or the optical connections 234b, 234c, . . . , 234n, the optical power target 242 for the in-service channel with the updated transmit power for the in-service channel. Based on such comparison, the optical controller 212 can further adjust the updated transmit power of the in-service channel to more closely match the optical power target 242 (or within a threshold). In some examples, the optical controller 212 can adjust the updated transmit power of the in-service channel a predetermined amount, or any amount, to more closely match the optical power target 242 for the in-service channel.

To that end, the optical controller 212 can adjust the updated transmit power of each of the in-service channels of the passthrough connection 234a and/or the optical connections 234b, 234c, . . . , 234n. Specifically, the optical controller 212 can adjust the updated transmit power of each of the in-service channels, including the channels that were in-service prior to receiving the instructions to place in-service the additional channel, and the newly in-service channel. The optical controller 212 can adjust the updated transmit power of each of the in-service channels based on, for each in-service channel, i) the optical power target 242 for the in-service channel and ii) the identified updated transmit power for the in-service channel. Thus, the OCM 210 determines the transmit power of each of the in-service channels, and the optical controller 212 adjusts the same based on the optical power target 242 to form a feedback loop.

In some examples, the optical controller 212 can adjust, and re-adjust, the transmit power of each of the previously in-service channels of the passthrough connection 234a and/or the optical connections 234b, 234c, . . . , 234n a threshold number of times. For example, the optical controller 212 can adjust the transmit power of each of the previously in-service channels for two or three iterations. In some examples, the optical controller 212 can adjust the transmit power of each of the previously in-service channels until each of the in-service channels is within a tolerance of the respective optical power target 242.

The SDN computing module 214 can further provide instructions to transition the additional channel to be placed in-service to a steady state mode. In response, the optical controller 212, in furtherance of equalizing the transmit power for each in-service channel of the passthrough connections 234 of the ROADM 202, transitions, at the ROADM 202, the newly in-service channel to the steady state mode (e.g., a "gainLoss" mode). Furthermore, independent of instruction from the SDN computing module 214, the optical controller 212, in furtherance of equalizing the transmit power for each in-service channel, can transition each in-service channel that was in-service prior to receiving the instructions to place in-service the additional channel to the steady state mode (e.g., a "gainLoss" mode"). In some examples, the optical controller 212 can transition each of the in-service channels to the steady state mode after adjusting the transmit power of each of the in-service channels. The steady state mode of the in-service channels can include a static state of the in-service channels. In some examples, the optical controller 212 can transition each of the in-service channels to the steady state mode at any time.

In some examples, the optical controller 212 can transition each of the in-service channels independent of instructions from the SDN computing module 214 to transition each of the in-service channels. Specifically, the SDN computing module 214 may be unaware that the transmit power of each of the previously in-service channels are being adjusted.

In some implementations, the SDN computing module 214 can identify a previously in-service channel of the passthrough connection 234a and/or the optical connections 234b, 234c, . . . , 234n is to be placed out of service at the ROADM 202 (e.g., as put out of service by the SDN computing module 214). Specifically, by placing the particular channel out of service, the channel's power on the signals 236a is reduced significantly. That is, the particular channel is to be removed by the multiplexer 204a. In some examples, the SDN computing module 214 provides instructions to the ROADM 202 over the DCN 216 to place out of service the particular channel.

The optical controller 212, in response to identifying the particular channel is to be placed out of service at the ROADM 202, can obtain the optical power targets 242 (or data indicating the optical power targets 242) for each in-service channel. For example, the optical controller 212 can obtain the optical power targets 242 for each in-service channel.

The optical controller 212, further in response to identifying the particular channel of the passthrough connection 234a and/or the optical connections 234b, 234c, . . . , 234n is to be placed out of service at the ROADM 202, can equalize a transmit power for each in-service channel of the ROADM 202, and the transmit power of the channel to be placed out of service (to a low power target). Specifically, the optical controller 212 can identify the transmit power of each in-service channel. In some examples, the transmit power of the in-service channel can include the transmit power of the channel (and corresponding wavelength of the channel) that is output by the multiplexer 204a, i.e., the transmit power at the signals 236a. In some examples, the OCM 210 can identify the transmit power of the in-service channels (and corresponding wavelengths) that are output by the optical amplifier 208c (e.g., at the signals 237a) and transmit such data to the optical controller 212. In other words, the OCM 210 can take per-channel power readings of all pre-existing in-service channels and the channel to be placed out of service.

The SDN computing module 214 can further provide instructions to transition the channel to be placed out of service to a power mode. In response, the optical controller 212, in furtherance of equalizing the transmit power for each in-service channel of the ROADM 202, can transition each in-service channel and the channel to be placed out of service to a power mode. That is, the optical controller 212 can change the state of each of the in-service channel to a power mode to hold a constant optical power of the in-service channels. The optical controller 212 transitions each of the remaining channels that were in-service prior to receiving the instructions to place the particular channel out of service only in response to the instructions to transition the particular channel to be placed out of service to a power mode. That is, the SDN computing module 214 does not provide specific instructions to transition the remaining in-service channels to power mode other than the instructions to transition the particular channel to be placed out of service to a power mode.

The optical controller 212, in furtherance of equalizing the transmit power for each in-service channel of the passthrough connection 234a and/or the optical connections 234b, 234c, . . . , 234n of the ROADM 202, can adjust the transmit power of each of the in-service channels and the channel to be placed out of service. In some examples, the optical controller 212 can adjust the transmit power of each of the in-service channels and the channel to be placed out of service after transitioning each of the in-service channels and the channel to be placed out of service to the power mode. The optical controller 212 can adjust the transmit power of each of the in-service channels and the channel to be placed out of service based on, for each in-service channel and the channel to be placed out of service, i) the optical power target 242 for the in-service channel and the channel to be placed out of service and ii) the identified transmit power for the in-service channel and the channel to be placed out of service.

The SDN computing module 214 can further provide instructions to transition the channel to be placed out of service to a power mode. In response, the optical controller 212, in furtherance of equalizing the transmit power for each in-service channel of the ROADM 202, transitions, at the ROADM 202, each in-service channel to a steady state mode. In some examples, the optical controller 212 can transition each of the in-service channels to the steady state mode after adjusting the transmit power of each of the in-service channels. The steady state mode of the in-service channels can include a static state of the in-service channels. In some examples, the optical controller 212 can transition each of the in-service channels to the steady state mode at any time.

In some implementations, a new channel of the passthrough connection 238a and/or the optical connections 238b, 238c, . . . , 238n can be placed in-service, or a previously placed in-service channel of the passthrough connection 238a and/or the optical connections 238b, 238c, . . . , 238n can be placed out of service, similar to that described herein with respect to channels of the passthrough connection 234a and/or the optical connections 234b, 234b, 234n. In some examples, the new channel of the passthrough connection 238a and/or the optical connections 238b, 238c, . . . , 238n can be placed in-service, or the previously placed in-service channel of the passthrough connection 238a and/or the optical connections 238b, 238c, . . . , 238n can be placed out of service, in combination with placing in-service a new channel of the passthrough connection 234a and/or the optical connections 234b, 234b, 234n or placing out of service a previously placed in-service channel of the passthrough connection 234a and/or the optical connections 234b, 234b, 234n.

In some examples, the SDN computing module 214 can further provide instructions to transition the channel to be placed out of service to an off mode. In response, the optical controller 212 can transition the channel to be placed out of service to an off mode. That is, the optical controller 212 can adjust the transmit power of the channel to be placed out of service (and corresponding wavelength of the channel) to have a maximum loss that is created by the respective multiplexers 204a, 204b and demultiplexers 206a, 206b.

In some examples, the optical environment 200 can include multiple ROADMs 202. For example, once the optical controller 212 adjusts the transmit powers of the in-service channels of the passthrough connections 234a, 238a and/or the optical connections 234, 238 based on the optical power targets 242, a further optical controller 212 of a further ROADM can similarly adjust the transmit powers of respective in-service channels based on respective power targets 242.

Figure 4:
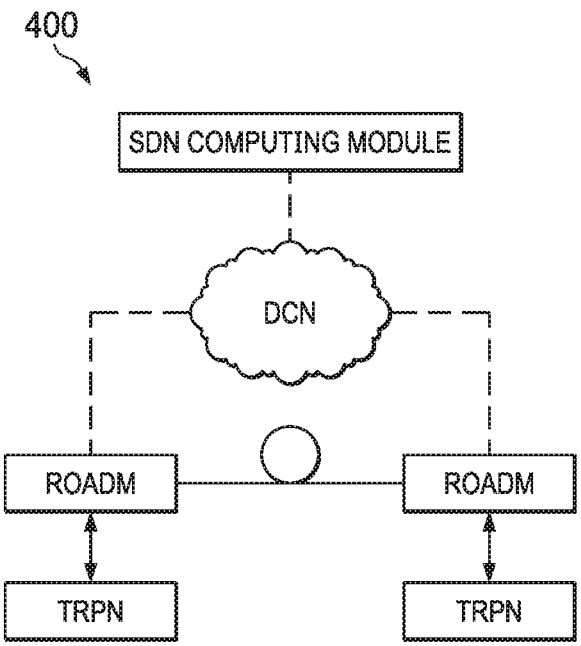
FIG. 4 illustrates a point-to-point optical network.
Figure 5:
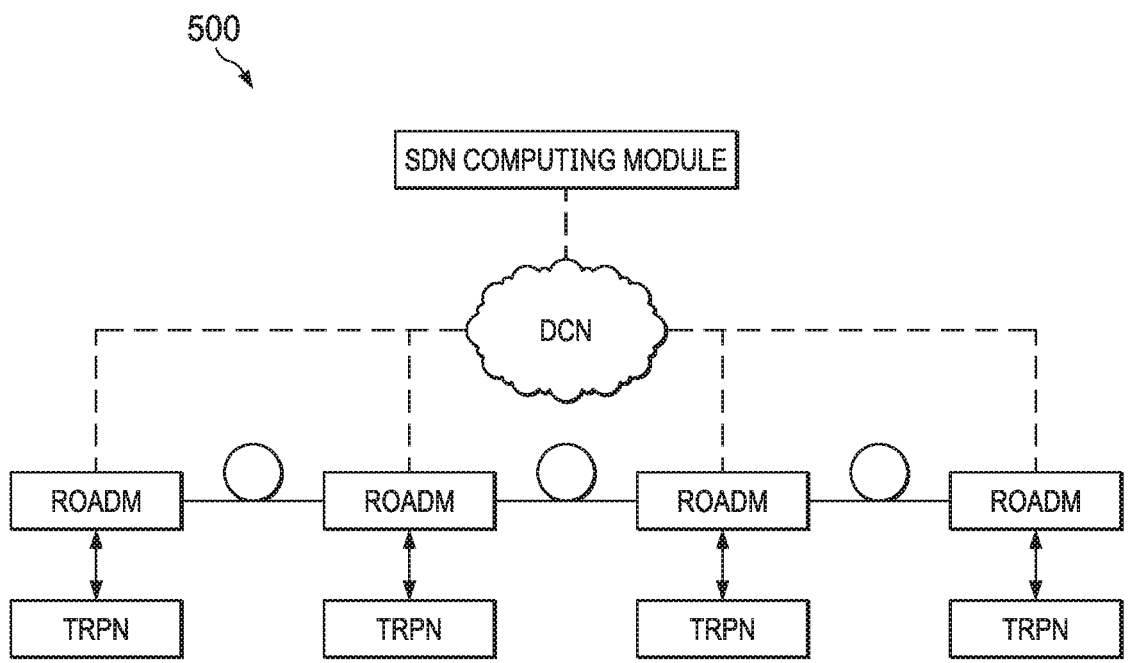
FIG. 5 illustrates a linear optical network.
Figure 6:
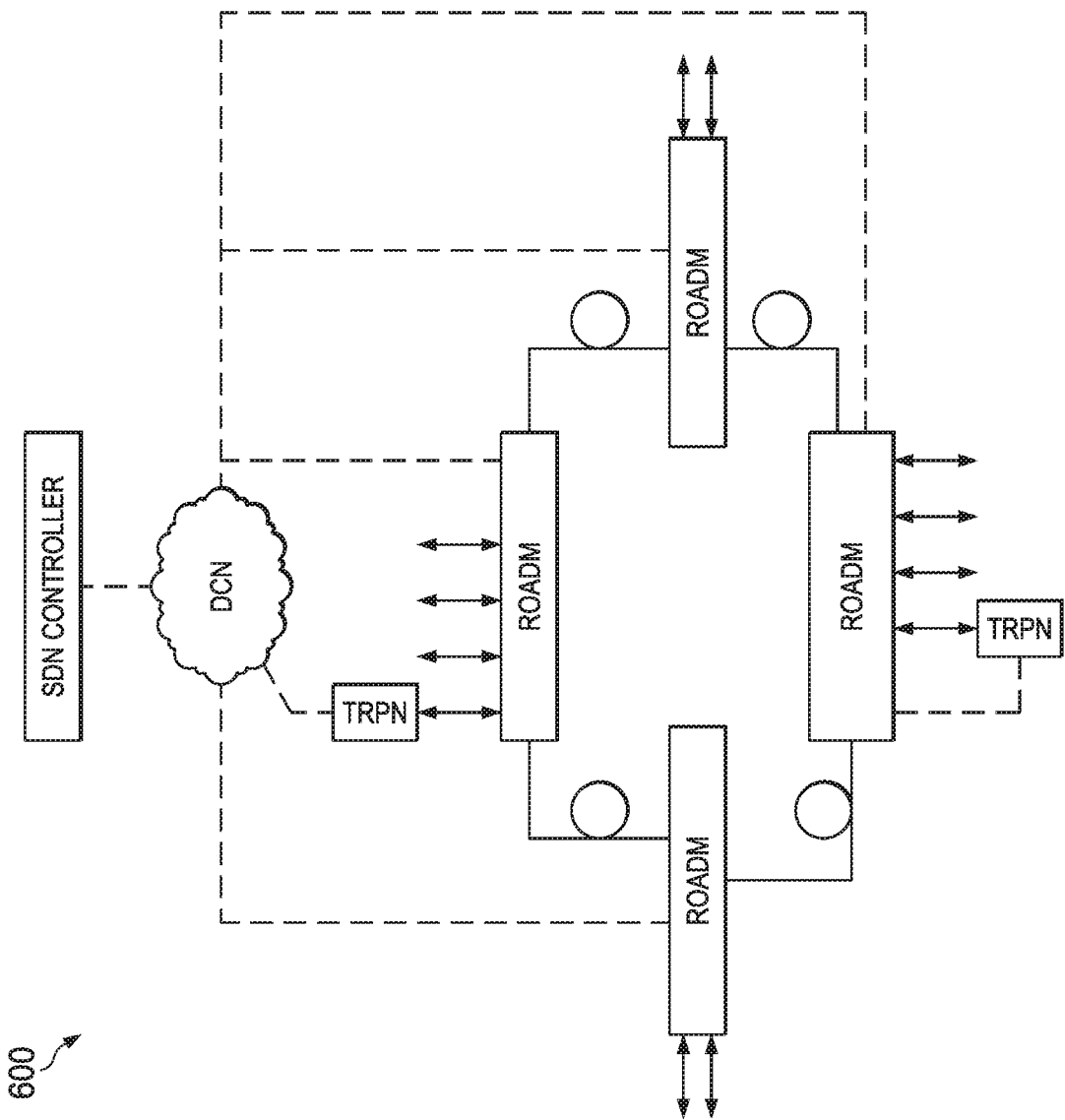
FIG. 6 illustrates a ring optical network.

For example, referring to FIG. 4, the optical environment can include a point-to-point optical network 400; referring to FIG. 5, the optical environment can include a linear optical network 500; and referring to FIG. 6, the optical environment can include a ring optical network 600.

Specifically, when the optical network includes the ring optical network 600, the ROADM 202, and in particular, the optical controller 212, can help facilitate obtaining a stability of the ring optical network 600. Specifically, when the net loop gain is more than zero dB, as the optical signals transmit through the ring optical network 600, the power of the optical signals increase, thus forming an unstable ring—e.g., optical lasing of the ring optical network 600. To that end, by adjusting the transmit power of the in-service channels at each ROADM of an optical network—e.g., the ring optical network 600—the loop gain of the ring optical network 600 is minimized, if not prevented, such that lasing of the ring optical network 600 is prevented.

Figure 7A:
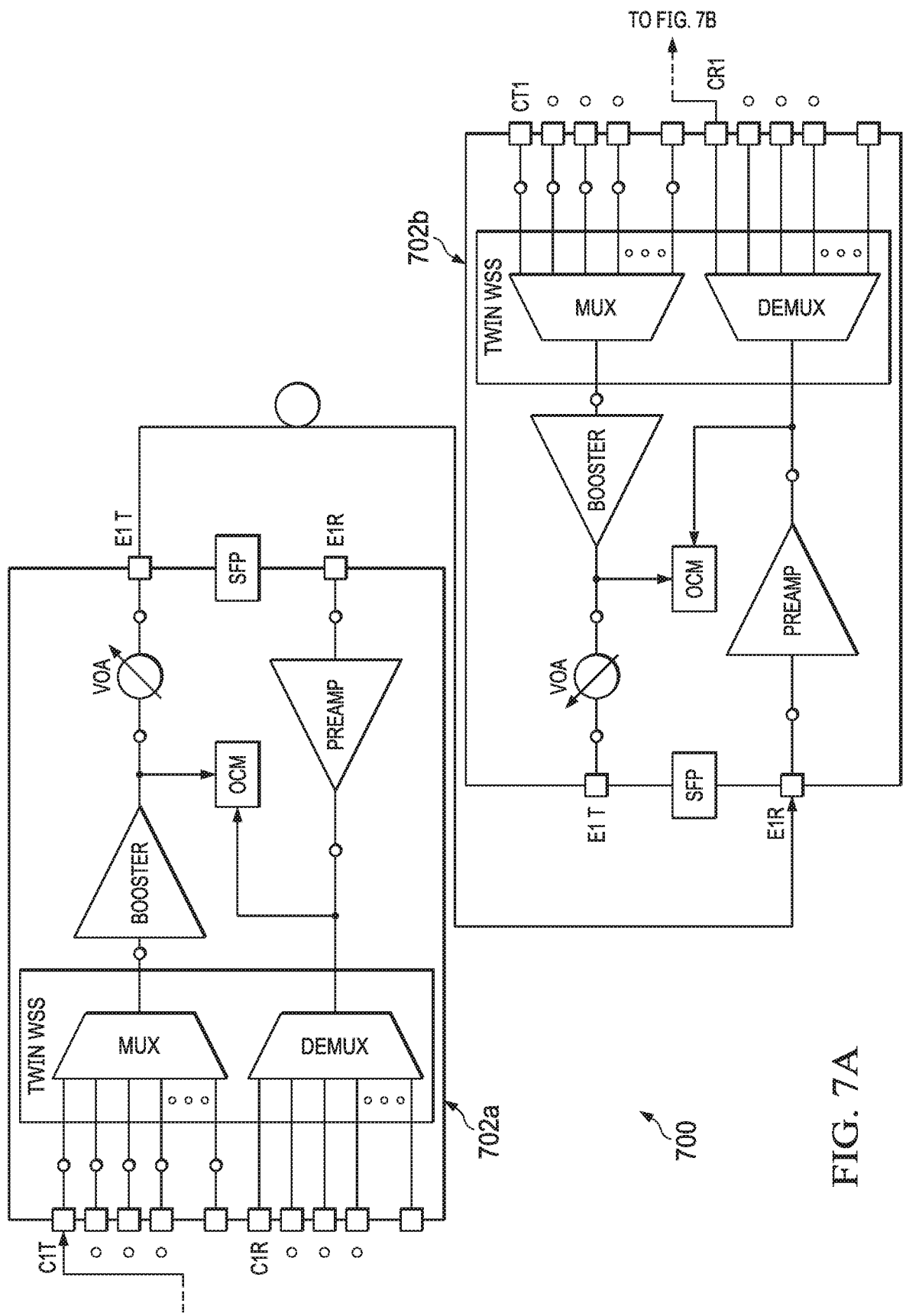
FIGS. 7A, 7B illustrate an optical environment including three optical nodes.
Figure 7B:
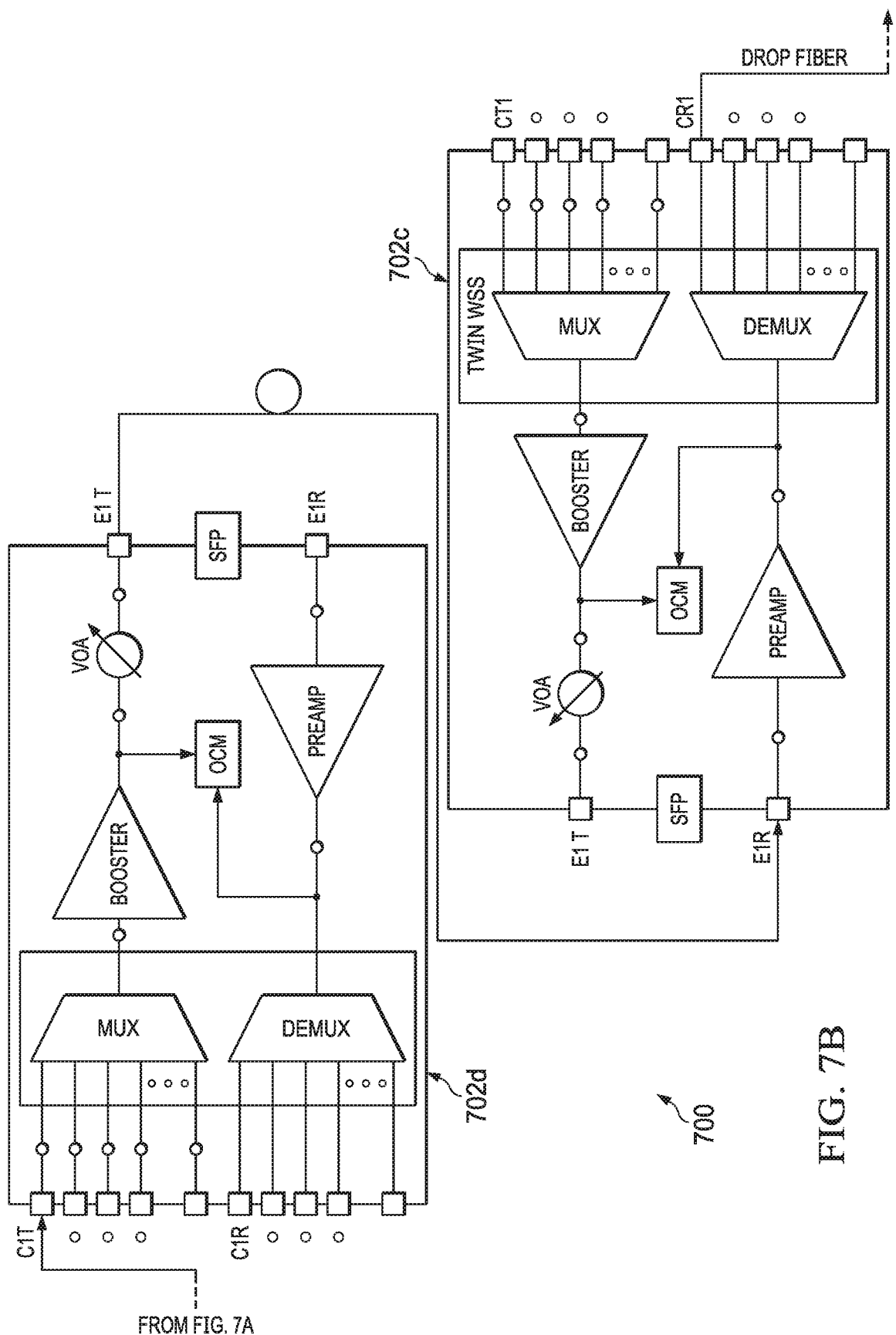

FIGS. 7A, 7B illustrate an optical environment 700 including optical blades 702a, 702b, 702c, 702d (collectively referred to as optical blades 702). The blades 702b, 702d, for example, could constitute an optical "passthrough" node. The optical blades 702 can include the ROADM 202 of FIG. 2. To that end, in an example, during channel turn-up at the optical blade 702a, a SDN computing module can provide instructions to the optical blade 702a to add a newly in-service channel at a specified target power. When the newly in-service channel is added within a time period, the SDN computing module can instruct the blade 702a to change state to the steady state mode ("gainLoss" mode). However, if the blade 702a is unable to achieve the specified target power of the newly in-service channel within the specified target power, the SDN computing module can instruct the blade 702a to change state to an off mode. The SDN computing module repeats the same sequentially node by node downstream to the drop node (e.g., the blade 702c). The SDN computing module can hold the drop node (e.g., the blade 702c) in a constant power state. In some examples, for new channel turn up, power adjustment starts at a first multiplexer connected to the add transponder, and then proceeds in sequence downstream through all nodes in serial (only after the previous upstream device has been placed in a steady state by the SDN computing module) to the eventual far end drop node. The far end drop node remains in power, and does not transition to a steady state. In some examples, only one multiplexer (e.g., multiplexer 204a, 204b) or demultiplexer (e.g., demultiplexer 206a, 206b) adjusts at a time (e.g., in the proper sequence) in a node or in the network. In some examples, two or more multiplexers or demultiplexers can adjust at a same time in a node or in the network. In some examples, each of the multiplexers and demultiplexers can adjust at a same time in a node or in the network.

Furthermore, in an example, during channel turn-down, an in-service channel is turned down sequentially in reverse order starting at the drop node (e.g., the blade 702c). The SDN computing module can instruct the blade 702c to set the mode of the channel to off after ramping down the power of the channel. In some examples, for placing a channel out of service, power adjustment starts at a first demultiplexer connected to the drop transponder, and then proceeds in sequence upstream through all nodes in serial (only after the previous downstream device has been placed in an off state by the SDN computing module) to the eventual add node. In some examples, only one multiplexer (e.g., multiplexer 204a, 204b) or demultiplexer (e.g., demultiplexer 206a, 206b) adjusts at a time (e.g., in the proper sequence) in a node or in the network. In some examples, two or more multiplexers or demultiplexers can adjust at a same time in a node or in the network. In some examples, each of the multiplexers and demultiplexers can adjust at a same time in a node or in the network.

In some examples, the optical environment 700 can be in steady state operation—all blades 702 are in a steady state mode ("gainLoss" mode) except the drop blade 702c that is in a power mode. In some examples, the optical environment 700 can be in a steady state operation with an upstream fiber cut/restore. That is, all blades 702 are in the steady state mode except drop blade 702c that is in power mode when the in-service channel is lost. Specifically, the blade 702c detects a channel loss of service and freezes the corresponding demultiplexer for any channels that are dropped, and maintain power for channels that were not dropped. If/when the loss of service clears, the blade 702c can resume a previous mode (e.g., power mode).

In some examples, the optical environment 700 can be in be a channel turn-up operation—the SDN computing module can equalize the power of a channel starting at the add node and then working downstream and then set the channel in steady state mode and the drop blade 702c in power mode. Specifically, the SDN computing module can provide instructions to the blade 702a to equalize the transmit power of the newly turned-up channel. In reaction, an optical controller sets all in service channels to power mode. The SDN will transition the state of the newly turned-up channel to steady state but the optical controller may autonomously do the same for the pre-existing in-service channels. The SDN computing module can provide instructions to the drop blade 702c to equalize the power of the in-service channels.

In some examples, the optical environment 700 can turn-up a channel at the add blade 702a with a fiber cut/restore. Specifically, the blade 702a detects a channel loss of signal and dropped channels freeze equalization in mux. Once the loss of channel clears, the previous power mode is resumed. After equalization is completed, the channels transition to a steady state mode.

In some examples, the optical environment 700 can turn-up a channel at the through node containing 702b and 702d, with upstream fiber cut/restore. Specifically, the node containing 702b and 702d maintains power for any channels not dropped but dropped channels freeze equalization in mux and demux. If/when the loss of service clears, the node containing 702b and 702d can resume a previous mode (e.g., power mode); and after equalization completes, the channels can transition to a steady state mode.

In some examples, the optical environment 700 can turn-up a channel at the through node containing 702b and 702d, with a passthrough fiber cut/restore. Specifically, the through node containing 702b and 702d is in channel turn up, with channel input lost at an egress blade of the node containing 702b and 702d. The node containing 702b and 702d maintains power for any channels not dropped but dropped channels freeze equalization in mux. If/when the loss of service clears, the node containing 702b and 702d can resume a previous mode (e.g., power mode); and after equalization completes, the channels can transition to a steady state mode.

In some examples, the optical environment 700 can turn-up a channel at the drop blade 702c, with an upstream fiber cut/restore. Specifically, the blade 702c maintains power for any channels not dropped but dropped channel freezes equalization in demux. If/when the loss of service clears, the blade 702c can resume a previous mode (e.g., power mode); and after equalization completes, the channels can transition to a steady state mode.

In some examples, the optical environment 700 can turn down a channel—blades 702a, 702b, 702d begin in a steady state operation and the node containing 702c is in a power mode. The SDN computing module provides instructions to the drop node containing blade 702c to turn down channel power, then off; and provides instructions to the pass-through node 702b and 702d to turn down channel power, then off. This is repeated sequentially in reverse order starting at the drop node containing 702c and working towards the add blade 702a. Furthermore, each of the in-service channels can be automatically set to power mode, and the remaining channels not being turned down can be automatically set to steady-state mode ("gainLoss" mode).

Figure 8:
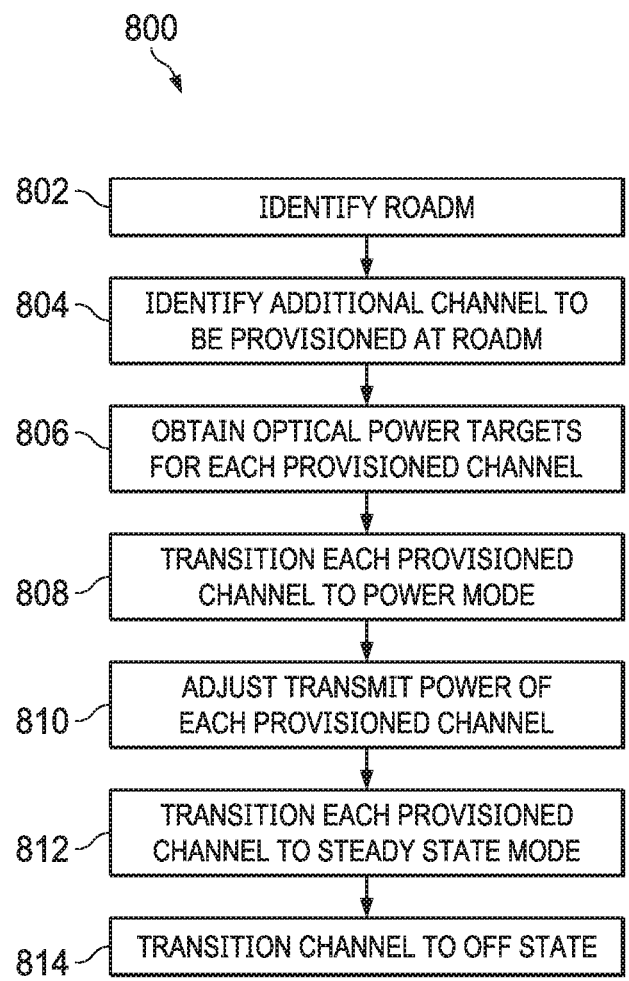
FIG. 8 illustrates a flowchart for transmit power equalization.

FIG. 8 illustrates a flowchart depicting selected elements of an embodiment of a method 800 for transmit power equalization. The method 800 may be performed by the optical environment 200 and/or the optical controller 212 described herein with reference to FIGS. 1-7. It is noted that certain operations described in method 800 may be optional or may be rearranged in different embodiments.

The ROADM 202 is identified (802). The ROADM includes in-service channels. The optical controller 212 identifies an additional channel that is to be in-service at the ROADM 202 or an existing channel that is to be taken out of service (804). In response to identifying the additional channel is to be in-service or the existing channel that is to be taken out of service at the ROADM 202, the optical controller 212 obtains optical power targets 242 for each in-service channel of the ROADM (806). Each in-service channel includes each previously in-service channel and the newly in-service channel. The optical controller 212 transitions, at the ROADM 202, each in-service channel to a power mode (808). The optical controller 212, after transitioning each in-service channel to the power mode, adjusts, at the ROADM 202, the transmit power of each in-service channel based on, for each in-service channel, the optical power target for the in-service channel and the identified transmit power for each in-service channel (810). The optical controller 212, after adjusting the transmit power of each in-service channel and in response to instructions from the SDN computing module 214, transitions, at the ROADM 202, each in-service channel to a steady state mode (812). Furthermore, independent of instructions from the SDN computing module 214, the optical controller may transition each previously in-service channel to the steady state mode. The optical controller 212 can, if an in-service channel is to be placed out of service, can transition the channel to an off mode (814).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
   identifying a reconfigurable optical add-drop multiplexer (ROADM), the ROADM including a plurality of previously in-service channels;
   identifying, by an optical controller, an additional channel that is to be placed in-service at the ROADM;
   in response to identifying that the additional channel is to be placed in-service at the ROADM:
      obtaining, by the optical controller, optical power targets for each in-service channel including the plurality of previously in-service channels and the additional in-service channel;
      equalizing, by the optical controller, a transmit power for each in-service channel of the ROADM, including:
         identifying the transmit power of each in-service channel;
         transitioning, at the ROADM, each in-service channel to a power mode;
         after transitioning each in-service channel to the power mode, adjusting, at the ROADM, the transmit power of each in-service channel based on, for each in-service channel, the optical power target for the in-service channel and the identified transmit power for the in-service channel; and
         after adjusting the transmit power of each in-service channel, transitioning, at the ROADM, each previously in-service channel to a steady state mode independent of instruction from a software-defined networking (SDN) computing module.

2. The computer-implemented method of claim 1, further comprising:
   after equalizing the transmit power for each in-service channel of the ROADM, at a first time, equalizing, by the optical controller and at a second time after the first time, the transmit power for each in-service channel, including:
      identifying an updated transmit power of each in-service channel; and
      adjusting, at the ROADM, the updated transmit power of each in-service channel based on, for each in-service channel, the optical power target for the in-service channel and the identified updated transmit power for the in-service channel.

3. The computer-implemented method of claim 1, wherein adjusting the transmit power of each in-service channel further comprises:
   adjusting a first in-service channel by increasing the transmit power of the first in-service channel; and
   adjusting a second in-service channel by decreasing a transmit power of the second in-service channel.

4. The computer-implemented method of claim 1, wherein obtaining the optical power targets includes:
   receiving, for each in-service channel, the optical power targets over a network from the SDN computing module.

5. The computer-implemented method of claim 1, wherein the optical controller equalizes the transmit power for each previously in-service channel only in response to instructions from the SDN computing module to transition the additional channel to the power mode.

6. The computer-implemented method of claim 1, wherein the transmit power is equalized, for each previously in-service channel, less than or equal to a threshold number of times.

7. The computer-implemented method of claim 1, wherein in response to identifying that the additional channel is to be placed in-service, the transmit power of each in-service channel is adjusted initially at a first multiplexer connected to an add transponder and proceed in sequence downstream through each node serially including a far end drop node.

8. A computer-implemented method, comprising:
identifying a reconfigurable optical add-drop multiplexer (ROADM), the ROADM including a plurality of previously in-service channels;
identifying, by an optical controller, that a previously in-service channel is to be placed out of service at the ROADM;
in response to identifying that the previously in-service channel is to be placed out of service at the ROADM:
obtaining, by the optical controller, optical power targets for each in-service channel;
equalizing, by the optical controller, a transmit power for each in-service channel of the ROADM, including:
identifying the transmit power of each in-service channel;
transitioning, at the ROADM, each in-service channel to a power mode;
after transitioning each in-service channel to the power mode, adjusting, at the ROADM, the transmit power of each in-service channel based on, for each in-service channel, the optical power target for the in-service channel and the identified transmit power for the in-service channel; and
after adjusting the transmit power of each in-service channel, transitioning, at the ROADM, each remaining in-service channel to a steady state mode independent of instruction from a software-defined networking (SDN) computing module.

9. The computer-implemented method of claim 8, further comprising:
after equalizing the transmit power for each in-service channel of the ROADM, at a first time, equalizing, by the optical controller and at a second time after the first time, the transmit power for each in-service channel, including:
identifying an updated transmit power of each in-service channel; and
adjusting, at the ROADM, the updated transmit power of each in-service channel based on, for each in-service channel, the optical power target for the in-service channel and the identified updated transmit power for the in-service channel.

10. The computer-implemented method of claim 8, wherein adjusting the transmit power of each in-service channel further comprises:
adjusting a first in-service channel by increasing the transmit power of the first in-service channel; and
adjusting a second in-service channel by decreasing a transmit power of the second in-service channel.

11. The computer-implemented method of claim 8, wherein obtaining the optical power targets includes:
receiving, for each in-service channel, the optical power targets over a network from the SDN computing module.

12. The computer-implemented method of claim 8, wherein the optical controller equalizes the transmit power for each in-service channel only in response to instructions from the SDN computing module to transition the previously in-service channel to be placed out of service to the power mode.

13. The computer-implemented method of claim 8, wherein the transmit power is equalized, for each previously in-service channel, less than or equal to a threshold number of times.

14. The computer-implemented method of claim 8, wherein in response to identifying that the previously in-service channel is to be placed out of service, the transmit power of each in-service channel is adjusted initially at a first demultiplexer connected to a drop transponder and proceed in sequence upstream through each node serially including an add node.

15. An optical system, comprising:
a reconfigurable optical add-drop multiplexer (ROADM), the ROADM including a plurality of previously in-service channels;
a software-defined networking (SDN) computing module in communication with the ROADM over a dynamic circuit network (DCN), the SDN computing module providing an instruction to place in-service an additional channel at the ROADM;
an optical controller included by the ROADM and configured to, in response to the instruction to place in-service the additional channel at the ROADM:
obtain optical power targets for each in-service channel including the plurality of previously in-service channels and the additional in-service channel;
equalize a transmit power for each in-service channel of the ROADM, including:
identify the transmit power of each in-service channel;
transition, at the ROADM, each in-service channel to a power mode;
after transitioning each in-service channel to the power mode, adjust, at the ROADM, the transmit power of each in-service channel based on, for each in-service channel, the optical power target for the in-service channel and the identified transmit power for the in-service channel; and
after adjusting the transmit power of each in-service channel, transition, at the ROADM, each previously in-service channel to a steady state mode independent of instruction from a software-defined networking (SDN) computing module.

16. The system of claim 15, wherein adjusting the transmit power of each in-service channel further comprises:
adjusting a first in-service channel by increasing the transmit power of the first in-service channel; and
adjusting a second in-service channel by decreasing a transmit power of the second in-service channel.

17. The system of claim 15, wherein obtaining the optical power targets includes:
receiving, for each in-service channel, the optical power targets over a network from the SDN computing module.

18. The system of claim 15, wherein the transmit power is equalized, for each previously in-service channel, less than or equal to a threshold number of times.

19. The system of claim 15, wherein in response to identifying that the additional channel is to be placed in-service, the transmit power of each in-service channel is adjusted initially at a first multiplexer connected to an add transponder and proceed in sequence downstream through each node serially including a far end drop node.

20. The system of claim 15, the optical controller further configured to:
- after equalizing the transmit power for each in-service channel of the ROADM, at a first time, equalizing, by the optical controller and at a second time after the first time, the transmit power for each in-service channel, including:
  - identifying an updated transmit power of each in-service channel; and
  - adjusting, at the ROADM, the updated transmit power of each in-service channel based on, for each in-service channel, the optical power target for the in-service channel and the identified updated transmit power for the in-service channel.

\* \* \* \* \*